United States Patent [19]

Fuhr et al.

[11] Patent Number: 5,102,931
[45] Date of Patent: Apr. 7, 1992

[54] FLAMEPROOFED, NON-DRIPPING POLYAMIDE MOULDING COMPOUND

[75] Inventors: Karl Fuhr, Krefeld; Friedemann Müller, Neuss; Karl-Heinz Ott, Leverkusen; Aziz El-Sayed, Leverkusen; Peter-Rolf Müller, Leverkusen; Martin Wandel, Dormagen, all of Fed. Rep. of Germany

[73] Assignee: Bayer Aktiengesellschaft, Leverkusen, Fed. Rep. of Germany

[21] Appl. No.: 556,309

[22] Filed: Jul. 23, 1990

[30] Foreign Application Priority Data

Aug. 4, 1989 [DE] Fed. Rep. of Germany ....... 3925791

[51] Int. Cl.⁵ ...................... C08J 5/10; C08K 5/5313
[52] U.S. Cl. .................................... 524/126; 524/116; 524/135; 524/405; 524/538; 524/546
[58] Field of Search ............... 524/135, 538, 546, 405, 524/116, 126

[56] References Cited

FOREIGN PATENT DOCUMENTS

| | | |
|---|---|---|
| 0095100 | 5/1983 | European Pat. Off. . |
| 0122699 | 10/1984 | European Pat. Off. . |
| 0139893 | 5/1985 | European Pat. Off. . |
| 0183195 | 6/1986 | European Pat. Off. . |
| 0332965 | 9/1989 | European Pat. Off. . |

*Primary Examiner*—Paul R. Michl
*Assistant Examiner*—U. K. Rajguru
*Attorney, Agent, or Firm*—Connolly & Hutz

[57] ABSTRACT

The subject of the invention is flameproofed, non-dripping polyamide moulding compounds which contain specific amounts of the following:

A) Phosphinic acid esters of polyphenols based on phenolaldehyde/ketone condensates,
B) Anti-dripping agents (such as polyfluoroethylene polymers or aramides),
C) Zinc borate,
D) Thermoplastics with a predominantly aromatic main chain and a high thermal deflection temperature (Vicat B ≧ 180° C.), and, if applicable, reinforcing agents and other additives for flameproofing and processing.

13 Claims, No Drawings

FLAMEPROOFED, NON-DRIPPING POLYAMIDE MOULDING COMPOUND

The subject of the invention is flameproofed, non-dripping polyamide moulding compounds which contain specific amounts of the following:

A) Phosphinic acid esters of polyphenols based on phenolaldehyde/ketone condensates,
B) Anti-dripping agents (such as polyfluoroethylene polymers or aramides),
C) Zinc borate,
D) Thermoplastics with a predominantly aromatic main chain and a high thermal deflection temperature (Vicat $B \geq 180°$ C.), and, if applicable, reinforcing agents and other additives for flameproofing and processing.

Esters of phosphinic acids and alcohols and/or phenols are well-known. They have also already been recommended as flameproofing agents. A claim was made under reference DE-OS 3 219 047 for phosphinic acid esters from divalent alcohols or monovalent/polyvalent phenols as flameproofing agents for moulding compounds of polyphenyl oxide and impact modified monovinyl aromatic compound polymers. Resorcinol, pyrocatechol and phloroglucinol are particularly indicated as polyvalent phenols.

No reference was made to phosphinic acid esters of phenolaldehyde/ketone condensates. Also, there are no details of the use of phosphinic acid esters of the type covered by the claim as flameproofing agents for polyamides employed in connection with anti-dripping agents (such as polyfluoroethylene polymers or aramides) and zinc borate.

The subject of the invention is flameproofed, non-dripping polyamide moulding compounds which contain the following additives given for 100 parts by weight of the polyamide moulding compound:

A) 3 to 20% by weight, preferably 5 to 15% by weight phosphinic acid esters of polyphenols of formula (I)

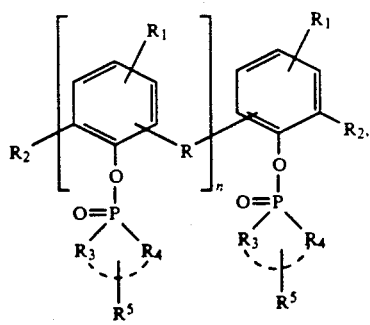

(I)

in which
n is an integer between 1 and 20, preferably between 1 and 10,
R is an alkylene group with 1 to 4 carbon atoms, a cycloalkylene group with 5 to 9 carbon atoms or, if n=1, a direct bond, a sulphonyl group or a carbonyl group or oxygen or sulphur respectively,
$R_1$ and $R_2$ are hydrogen, halogen, alkyl groups with 1 to 12 carbon atoms, cycloalkyl groups with 5 to 9 carbon atoms, aryl groups with 6 to 10 carbon atoms $R_3$ and $R_4$ are alkyl groups with 1 to 4 carbon atoms and/or aryl groups with 6 to 10 carbon atoms, in which $R_3$ and $R_4$, in the case of alkyl groups, can also be bonded by a single or double bond and a ring formed via $R_3$ and $R_4$ and the phosphorus atom can carry alkyl groups $R_5$ with 1 to 4 carbon atoms and —R— is bonded in the ortho- or para-position of the phenol nucleus, whereby then $R_1$ is bonded to the para- and ortho-position respectively, B) Anti-dripping agents with a total amount not exceeding 6% by weight and preferably not more than 3% by weight, from the series comprising
B1) 0.1–3% by weight, preferably 0.3–1.0% by weight of a polyfluoroethylene polymer and/or
B2) 0.1–5% by weight, preferably 1–2.5% by weight, of an aramide,
C) 0.5 to 15% by weight, preferably 3 to 12% by weight, of zinc borate, preferably hydrates of zinc borate, as a flameproofing reinforcing agent,
D) 1 to 30% by weight, preferably 5 to 25% by weight, of a thermoplastic with a predominantly aromatic main chain and a high thermal deflection temperature (Vicat $B \geq 180°$ C.) and, if appropriate, other additives from the series comprising
E) 0–40% by weight, preferably 15 to 30% by weight, of an inorganic filler and/or reinforcing agents and/or pigments,
F) 0 to 30% by weight, preferably 5 to 20% by weight, of additional flameproofing agents such as nitrogen compounds, halogen compounds and/or other phosphorus compounds,
G) 0 to 10% by weight, preferably 1 to 5% by weight, of processing auxiliaries and
H) 0 to 20% by weight of customary additives for polyamides such as UV, light and heat stabilizers, known agents for improving impact strength and for improving compatibility.

The amounts of additives in the polyamide mixture should not, in the preferred embodiment, exceed a total of 65% by weight, preferably 60% by weight and in particular 55% by weight; here partial amounts should also be limited where applicable; hence the total amounts of flameproofing additives (A+B+C+D+F) should not exceed 50% by weight, preferably 45% by weight and in particular 40% by weight; the total amounts of additives (G+H) should not exceed 25% by weight and the total amounts of E) should not exceed 40% by weight of the polyamide mixture.

The phosphinic acid esters (I) employed in the invention are alkyl- and aryl-phosphinic acid esters of bisphenols and polyphenols, such as are represented by condensation products of phenols with aldehydes or ketones. Thus alkyl- and aryl-phosphinic acid esters of bisphenols and high molecular phenol formaldehyde condensation products (generally known as novolaks) are preferred as per formulae (II) and (III), where formula (II) represents phosphinic acid esters of bisphenols and formula (III) represents those of novolaks ($n \geq 2$), preferably 3–8

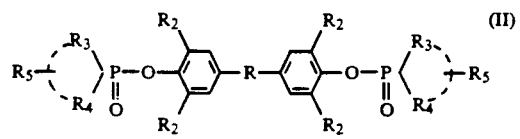

(II)

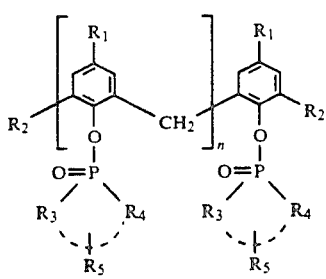

and where n represents an integer between 2 and 15, preferably between 2 and 10, R represents a single bond, a methylene group, an isopropylidene group, oxygen, sulphur, a sulphonyl group or a carbonyl group, $R_1$ represents hydrogen, halogen or an alkyl group with 1 to 12 carbon atoms, $R_2$ represents hydrogen, halogen or an alkyl group with 1 to 4 carbon atoms, $R_3$ and $R_4$ represent methyl, ethyl, phenyl groups or $R_3$ and $R_4$ together represent the butylidene and/or $R_5$-alkyl-butylidene groups.

Most particularly preferred are formula (IV) and (V) compounds

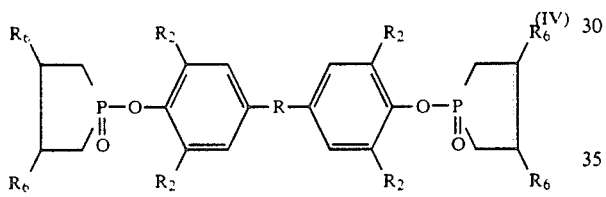

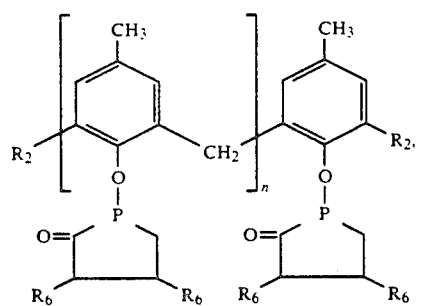

in which n represents an integer between 2 and 8,

R has the meaning described above, $R_2$ represents hydrogen or methyl groups and $R_6$ also represents hydrogen or methyl groups.

Polyamides, within the meaning of the invention, are all amorphous and/or partly crystalline, predominantly aliphatic/cycloaliphatic thermoplastic polyamides which are produced according to the known polycondensation and/or polymerization process from predominantly aliphatic/cycloaliphatic diamines with dicarboxylic acids and/or lactams from 4 methylene groups in the lactam ring. Source materials are aliphatic or mixed aliphatic aromatic dicarboxylic acids having less than 50% by weight aromatic constituents such as adipic acid, 2,2,4- and 2,4,4,-trimethyladipic acid, azelaic acid, sebacic acid, decanedicarboxylic acid, dodecanedicarboxylic acid, cyclohexanedicarboxylic acid, hexahydroterephthalic acid, isophthalic acid and terephthalic acid, also aliphatic and aromatic diamines such as hexamethylenediamine, 2,2,4- and 2,4,4-trimethylhexamethylenediamine, diaminodicyclohexylmethane (isomers), diaminodicyclohexylpropane (isomers) and isophoronediamine (isomers), xylylenediamine and aminocarboxylic acids such as ε-aminocaproic acid and ω-aminocarboxylic acids such as ω-aminoundecanoic acid and -aminolauric acid.

Copolyamides from the majority of the known monomers can also be used.

Polyamide-6, Polyamide-6,6, Polyamide-6,10, Polyamide-6,12, Polyamide 11, Polyamide-12, Polyamide-6T6 or 6I6 having aromatic contents of less than 50% by weight are preferred. They should preferably have a relative viscosity (measured in a 1% by weight solution in m-cresol at 25° C.) of 2.0 to 5.0, preferably 2.5 to 4.0.

The polyamides can be produced according to known processes (see Kunststoff-Handbuch (Plastics Handbook) Volume VI, pages 11 to 198, Carl-Hanser-Verlag, Munich, 1966).

A) Phosphinic Acid Esters

The phosphinic acid esters employed in the invention are the dialkyl-, diaryl- and alkylarylphosphinic acid esters of bisphenols and polyphenols (novolaks). Since the phosphinic acids cannot be converted directly to the esters according to the invention, their reactive derivatives are used. These are the acid chlorides which are converted by splitting off hydrogen chloride and phenyl esters (likewise prepared from the acid chlorides) which are reacted with the polyphenols to give the esters according to the invention by splitting off phenol (transesterification).

Examples of phosphinic acids are dimethylphosphinic acid, methylethylphosphinic acid, diethylphosphinic acid, methylphenylphosphinic acid, ethylphenylphosphinic acid, diphenylphosphinic acid, di-p-tolyphosphinic acid and phenylnaphthylphosphinic acid as well as 1-hydroxy-1-oxo-phospholine, 1-hydroxy-1-oxo-3-methyl-phospholine and 1-hydroxy-1-oxo-3,4-dimethyl-phospholine.

The processes for producing phosphinic acids and their derivatives such as chloride and phenyl ester are known and documented (Methoden der organischen Chemie (Methods of organic chemistry) (Houben-Weyl), Volume XII/1, pages 217 to 266 and Volume E2, pages 123 to 221).

The reaction of phosphinic acid chloride with disphenols and polyphenols is carried out at temperatures of 180° to 200° C. with the hydrogen chloride being split off very slowly. With the help of catalysts such as magnesium chloride this can be successfully carried out at lower temperatures over shorter times. When using lower temperatures, inert solvents with a high boiling rate must be used for the esterification of novolaks for reasons of viscosity. Magnesium chloride or tertiary amines are customarily used as catalysts. Magnesium chloride is likewise used as the catalyst in the considerably faster transesterification process. Again, temperatures are 200° C.

Bisphenols and novolaks are produced in accordance with known processes (for bisphenols, see H. Schnell and H. Krimm, Angew. Chemie 75 (1963), 662 to 668; for novolaks, see Methoden der organischen Chemie (Houben-Weyl), Volume XIV/2, pages 193 to 292 and Ullmanns Encyclopädie der Technischen Chemie, 4th edition, Volume 18, pages 245 to 257).

The following should be mentioned as suitable bisphenols:
Bis-(hydroxyphenyl)-alkane,
Bis-(hydroxyphenyl)-cycloalkane,
Bis-(hydroxyphenyl)-ether,
Bis-(hydroxyphenyl)-ketone,
Bis-(hydroxyphenyl)-sulphone,
along with their nucleus alkylated and nucleus halogenated derivatives.

The most important bisphenols within the context of the invention are: 4,4'-dihydroxydiphenyl, 2,2-bis-(4-hydroxyphenyl)-propane, bis-(4-hydroxyphenyl)-methane, 4,4'-dihydroxybenzophenone, 4,4'-dihydroxydiphenylether, 4,4'-dihydroxydiphenylsulphide, 4,4'-dihydroxydiphenylsulphone and their nucleus substituted derivatives in which, preferably, CH$_3$, Cl or Br are considered. A nucleus methylated derivative is 2,2-bis-(4-hydroxy-3,5-dimethylphenyl)-propane.

Diphenols particularly preferred are 2,2-bis-(4-hydroxyphenyl)-propane, 4,4'-dihydroxydiphenyl, 4,4'-dihydroxydiphenylether, 4,4'-dihydroxydiphenylsulphone, 4,4'-dihydroxybenzophenone and 2,2-bis-(4-hydroxy-3,5-dimethylphenyl)-propane.

Mixtures of diphenols can also be used.

Suitable novolaks are condensation products from formaldehyde and phenols of the general formula (VII)

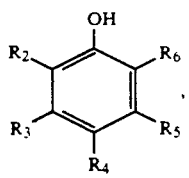

(VII)

in which
R$_2$ and R$_6$ represent hydrogen atoms and R$_3$, R$_4$ and R$_5$ can be alternatively hydrogen, again, halogen or C$_1$-C$_{20}$-alkyl groups, cycloalkyl groups or C$_6$-C$_{10}$-aryl groups, or in which R$_2$ and R$_4$ represent hydrogen atoms and R$_3$, R$_5$ and R$_6$ can likewise be the above-mentioned groups.

Characteristic examples are (list not limitative): phenol, o-cresol, m-cresol, p-cresol, 2,5-dimethyl-, 3,5-dimethyl-, 2,3,5-trimethyl-, 3,4,5-trimethyl-, p-t-butyl, p-n-octyl-, p-stearyl-, p-phenyl-, p-(2-phenylethyl)-, o-isopropyl-, p-isopropyl-, m-isopropylphenol and numerous other phenols.

Phenol, o-cresol, m-cresol, p-cresol, p-t-butylphenol, o-t-butylphenol and p-octylphenol are to be used by preference.

However, mixtures of these phenols can also be used.

The preferred novolaks to be used are the following (the list is not limitative):
phenol/formaldehyde novolak,
o-cresol/formaldehyde novolak,
m-cresol/formaldehyde novolak,
p-cresol/formaldehyde novolak,
t-butylphenol/formaldehyde novolak,
p-octylphenol/formaldehyde novolak.

The p-cresol/formaldehyde novolak is particularly preferred.

B) Anti-Dripping Agents

The polyfluoroethylene polymers B1) suitable for the purposes of the invention are polymers with a fluorine content of 65 to 76% by weight, preferably 70 to 76% by weight. Examples are polytetrafluoroethylene, tetrafluoroethylene-hexafluoropropylene copolymers, tetrafluoroethylene-difluoroethylene copolymers or tetrafluoroethylene copolymers with small amounts of fluorine-free copolymerizable, ethylene-unsaturated monomers. They are known polymers. They can be used in fine particle form, usually as a powder. They can be produced according to recognised processes such as polymerization of tetrafluoroethylene in a hydrous medium with a free radical forming catalyst (sodium-, potassium- or ammoniumperoxidisulphate) at pressures of 7 to 71 kg/cm$^2$ and at temperatures of 0° to 200° C., preferably at temperatures of 20° to 100° C. (for further details, see U.S. Pat. No. 2,393,967 for example).

The polyfluoroethylene polymers suitable for the purposes of the invention should preferably have an average molecular weight $\overline{M}_w$ of between 10$^5$ and 10$^6$.

The polyfluoroethylene polymers will preferably be used in unbaked form.

The addition of polyfluoroethylene polymers has the particular effect of reducing or completely preventing the melted moulding compound from dripping during the heating process.

As anti-dripping agents, suitable aromatic polyamides B2) are normally produced from aromatic arylenedicarboxylic acids and aromatic diamines by solvent condensation or by interface condensation (Kirk-Othmer, Encyclopedia of Chemical Technology, Third Edition, Volume 3, pages 213 to 242).

Arylenedicarboxylic acids are, in particular, phthalic acid, isophthalic acid and terephthalic acid.

Aromatic diamines are, for example: o-phenylenediamine, m-phenylenediamine, p-phenylenediamine, diaminodiphenyls in which the phenyl elements are combined hetero-atoms or groups in accordance with the formula

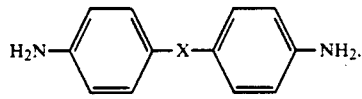

X=—O—, —S—, —SO$_2$—, —CO—, —CH$_2$—,
—C(CH$_3$)$_2$—, —CF$_2$—.

In addition, polyimidamides such as the following are suitable as anti-dripping agents:

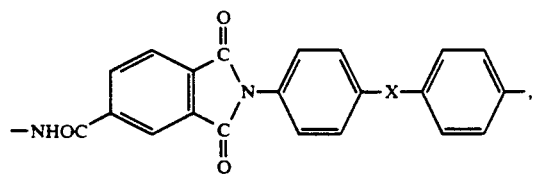

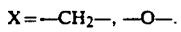

X=—CH$_2$—, —O—.

Also suitable are aramides which contain heterocyclic structures in their main chain, such as oxidazole, triazole, bithiazole, benzimidazole, hydantoin and chinazolone structures (see Ullmanns Encyklopädie der Technishen Chemie, 4th Edition, Volume 11, pages 345 to 350) and which, where applicable, are synthesized using dicarboxylic acids, diamine or aminocarboxylic acids.

Also suitable are those aromatic polyamides which consist of the above-mentioned aromatic polyamides for greater than 50% of their total weight, with the remainder being (cyclo)aliphatic carboxylic acids and/or (cyclo)aliphatic diamines. The following examples can be used as aliphatic dicarboxylic acids:

Adipic acid, 2,2,4- an 2,4,4-trimethyladipic acid, azelaic acid, sebacin acid, decanedicarboxylic acid and dodecanedicarboxylic acid.

The following examples may be used as aliphatic diamines:

Hexamethylenediamine, 2,2,4- and 2,4,4-trimethylhexamethylenediamine, diaminodicyclohexylmethane (isomers), diaminodicyclohexylpropane (isomers), isophoronediamines and xylylenediamines.

C) Zinc Borate (Hydrates)

Zinc borates (hydrates) can be products of different compounds (see Ullmanns Encyclopedia of Industrial Chemistry, 5th Edition, Volume A4, page 276). $2ZnO*3B_2O_3*3.5H_2O$ is especially suitable as a flameproofing agent for polyamide moulding compounds because of its stability in the temperature range 290°–300° C.

D) Aromatic Thermoplastics

Polyalkylenecarboxylic acid esters, polysulphones, polyethersulphones, polyketones, polyetherketones polyphenyleneoxides and polyarylenesulphides, among others, are used for the purposes of the invention as thermoplastics with predominantly aromatic main chains and a high thermal deflection temperature (Vicat B ≧ 180° C.). These thermoplastics are produced in accordance with known and documented processes.

E) Reinforcing Agents

As applicable, the inorganic reinforcing agents E) suitable for use for the purposes of the invention include all known agents for reinforcing polyamides. The following are given as examples: glass fibres, glass beads and/or mineral fillers as described in Katz and Milewski's "Handbook of Fillers and Reinforcements for Plastics", Nostrand-Verlag, 1978.

Glass fibres will preferably be used as the reinforcing agents. The glass fibres employed generally have a diameter of approximately 6 to 15 μm, preferably 8 to 13 μm, and a length-to-thickness ratio of greater than 45 and preferably 50 to 200.

Other possible fillers and reinforcing agents are: micro glass beads, carbon fibres, chalk, quartz (novaculite, for example) and silicates such as asbestos, feldspar, mica, talcum, wollastonite and kaolin in calcined and non-calcined form, plus other fillers and pigments using alkaline earth metal carbonates, alkaline earth metal oxides, titanium dioxide and/or zinc sulphide. The mineral fillers employed have average particle diameters of less than 20 μm and preferably less than 10 μm. They can be surface modified in a suitable manner, for example they may be treated with aminoalkylsilanes.

F) Other Flameproofing Agents

The organic halogen compounds suitable for flameproofing agent combinations are widely known; for example, halogenated Diels-Alder adducts, e.g. hexachlorocyclopentadiene, hexachloroendomethylenetetrahydrophthalic acid and the anhydride therefrom, bis-(hexachlorocyclopentadiene)cyclooctane (Dechlorane Plus from the Occidental Chemical Corp., USA) and tetrachlorophthalic acid anhydride.

Other possible flameproofing agents containing bromine are, for example: hexabromobenzole, pentabromotoluene, octa- and decabromodiphenyl, octa- and decabromodiphenylether, hexabromo-bis-phenoxyethane, ethylene-bis-tetrabromophthalimide and mixtures thereof, plus brominated polystyrols (Pyro-Check types from the Ferro Corp., USA) and brominated polyphenyleneoxide (Great Lakes PO-64 P from the Great Lakes Chem. Corp., USA).

Organic phosphorus compounds such as phosphate and phosphonate are particularly suitable as flameproofing agent combinations. Aromatic phosphates, e.g. triphenylphosphate and dicresylphenylphosphate are preferred, also phosphonates such as diphenylmethylphosphonate, dicresylphenylphosphonate and phosphoric acid esters and phosphonic acid esters of novolaks. In addition, red phosphorus (preferably stabilized in the usual way) can be used, either pure or in capsule form, as a flameproofing agent.

Examples of organic nitrogen compounds which are suitable for flameproofing agent combinations are: melamine, cyanuric acid and salts of these components such as melamine cyanurate, melamine borate and/or melamine phosphate.

Other possible flameproofing agents which can be used are metal oxides, e.g. antimony(III)-oxide, lead(IV)-oxide, cerium(IV)-oxide, copper(II)-oxide, molybdenum(VI)-oxide, vanadium(V)-oxide, bismuth(III)-oxide, tungsten(VI)-oxide, tin(IV)-oxide and zircon(IV)-oxide, as well as mixtures of these.

G) Processing Auxiliaries

Mould release agents, stabilizers, flow auxiliaries and plasticisers can be added as processing auxiliaries (F) to the moulding compounds to which the invention relates.

Ester waxes such as mineral wax, amide waxes such as Rhenax ® and/or oligoethylenes can be used as mould-release agents. Possible plasticisers are, e.g. aliphatic oligomer polyesters (see EP 29 931 and DE 2 706 128).

H) Impact Strength Modifiers

The following are particularly suitable as impact strength modifiers: rubbers such as butadieneacrylonitrile copolymers, butadienestyrol copolymers, butadienestyrol block copolymers, alkylacrylate rubbers, EP- and EPDM rubber systems and silicon rubbers. The use of graft rubbers as rubber components is preferred, in which vinyl mono- or copolymers are grafted onto the above-mentioned rubber systems, for which the glass temperature of the graft base should be below −10° C. By preference these should also contain polyamide-adhesive groups such as carboxyl groups or anhydride groups. Especially preferred are graft rubbers of the type MBS- or MABS- or EP- or EPDM- or EBDM-rubbers (E=ethylene, B=butylene, P=propylene) onto which maleic anhydride or styrolmaleic anhydride are grafted in small particles. Further examples are given in U.S. Pat. Nos. 4,174,358, 3,845,163, 3,668,274 and 4,174,358.

The production of the mixtures of thermoplastic polyamides, phosphinic acid esters of polyphenols, polyfluoroethylene polymers and/or aramides, thermoplastics with predominantly aromatic main chains and high thermal deflection temperatures (Vicat B ≧ 180° C.), inorganic reinforcing agents, fillers and pigments, other flameproofing agents and processing auxiliaries can be carried out using ordinary mixing units such as rollers, moulds, single and multi shaft extruders. The processing auxiliaries can be added as concentrates to the thermoplastic polyamide in granular form or as a powder mix by compounding the components. The temperature should normally be between 260° and 285° C. while the mixtures and moulded parts from these are being produced.

The production process can be carried out either continuously or discontinuously under conditions in which oxidation is largely excluded, i.e. preferably under inert gas atmospheres. Nitrogen, carbon dioxide and/or argon are examples of suitable inert gases.

The finished flameproof polyamide moulded parts are particularly suitable for application in the electrical and automobile sectors and they are used, for example, in the production of housings and covers for technical equipment such as electrical household equipment and automobile parts.

EXAMPLES

A. Components Used

I. Polyamide 66, in granular form, with a relative viscosity of 3.0 measured in a one-percent solution in m-cresol at 25° C.;

II. Reaction product (ester) from 4,4'-dihydroxydiphenylmethane and 1-chloro-1-oxo-3-methyl-phospholine (molecular ratio 1:2);

III. Methylethylphosphinic acid ester of a novolak from p-cresol and formaldehyde, OH number 468, number of phenol nuclei (nuclear number) approx. 5;

IV. Reaction product (ester) from novolak as per III and 1-chloro-1-oxo-phospholine;

V. Reaction product (ester) from novolak as per III and 1-chloro-1-oxo-methylphospholine;

VI. Reaction product (ester) from novolak as per III and triphenylphosphate melting point 75° C. (Kofler heating bench);

VI. Polytetrafluoroethylene powder, Hostaflon TF 2027 from Hoechst AG;

VIII. Aramide fibre, Kevlar 29 from DuPont de Nemours, USA;

IX. Zinc borate (hydrate), $2ZnO*3B_2O_3*5H_2O$, Firebrake ZB from U.S. Borax & Chemical Corp., USA;

X. Polyphenylenesulphide,

XI. Polyethersulphone from bisphenol A and 4,4'-dihydroxydiphenylsulphone,

XII. Poly-2,6-dimethyl-phenyloxide,

XIII. Short glass fibre, type CS 7919 from Bayer AG;

XIV. Bis-(hexachlorocyclopentadiene)-cyclo-octane, Dechlorane Plus 25 from Occidental Chemical Corp., USA;

XV. Melamine-cyanurate.

B. Production of the Phosphinic Acid Ester Additives Employed

1) Phosphinic acid ester from 1-chloro-1-oxo-3-methylphospholine and bisphenol F (4,4'-dihydroxydiphenylmethane)

200.2 g (1 mole) bisphenol F is heated under nitrogen in a 1 l flask with heating bath, agitator and gas tubes for nitrogen, dropping funnel and reflux cooler to 170° to 180° C. Then in 2 hours 301.1 g (2 mole) 1-chloro-1-oxo-3-methylphospholine is dripped in. After 18 hours hydrogen chloride production is completed.

After cooling, the still warm ester is introduced into 1 l methylenechloride and washed with chloride-free water. After drying the methylenechloride solution, the sodium sulphate is filtered off and the solution is concentrated. The yield is 379.1 g=88.5% of the theoretical yield. The result is resinous. The phosphorus content is 13.8% (theoretical 14.5%), the OH number is <10.

2) Phosphinic acid ester from methylethylphosphinic acid chloride and a novolak from p-cresol 239.7 g (2 gram equiv.) of a novolak of p-cresol and formaldehyde (OH number 468, nuclear number ca. 5) and 5.7 g (0.06 mole) magnesium chloride is heated under nitrogen in a 2 l flask with heating bath, agitator, gas tubes for nitrogen, dropping funnel and reflux cooler to 190° to 200° C. Then in 1 hour 253.1 g (2 mole) methylethylphosphinic acid chloride is dripped in. After 72 hours hydrogen chloride production is completed.

After cooling, the still warm ester is introduced into 2 l methylenechloride and washed with chloride-free water. After drying the methylenechloride solution, the sodium sulphate is filtered off and the solution is concentrated. The yield is 402.4 g=95.8% of the theoretical yield. Softening point is 98° C. on the Kofler heating bench. The phosphorus content is 13.4% (theoretical 14.5%) and the OH number is 0.

3) Phosphinic acid ester from 1-chloro-1-oxo-phospholine and a novolak from p-cresol 240.3 g (2 gram equiv.) of a novolak of p-cresol and formaldehyde (OH number 469, nuclear number ca. 5) and 273.1 g (2 mole) 1-chloro-1-oxo-phospholine is reacted as described under 2. Finishing is also carried out as under 2.

The yield is 423.2 g=96.1% of the theoretical yield. Softening point is 134° C., the phosphorus content is 13.1% (theoretical 14.1%) and the OH number is 0.

4) Phosphinic acid ester from 1-chloro-1-oxo-3-methylphospholine and a novolak from p-cresol 240.3 g (2 gram equiv.) of a novolak of p-cresol and formaldehyde (OH number 468, nuclear number ca. 5) and 301.1 g (2 mole) 1-chloro-1-oxo-3-methylphospholine is reacted as described under 2. The finishing is also carried out as per 2.

The yield is 437.1 g=93.3% of the theoretical yield. Softening point is 136° C., the phosphorus content is 12.6% (theoretical 13.2) and the OH number is 0.

5) Phosphoric acid ester from triphenylphosphate and a novolak from p-cresol 359.6 g (3 gram equiv.) of a novolak of p-cresol and formaldehyde (OH number 468, nuclear number ca. 5) and 652.6 g (2 mole) triphenylphosphate and 8.6 g magnesium chloride (0.09 mole) is heated under a 300 mbar vacuum at 200° C. in a 2 l flask which is equipped with an adjustable mushroom heating hood, capillaries and short Vigreux column with a descending cooler to melting point for 0.5 hours. The nitrogen flow introduced via the capillaries ensures that the mixing is good. Next, in 1.5 hours, with a vacuum falling from 20 to 3 mbar and with temperatures of 200° to 210° C., 282.3 g (3 mole) phenol is distilled off via the column and cooler. It is then heated for 1 hour at 250° C. with a vacuum of 3 mbar.

After cooling, the reaction product is introduced into 2 l methylenechoride and washed with chloride-free water. After drying the methylenechloride solution, the sodium sulphate is filtered off and the solution is concentrated. The yield is 694.9 g=95.2% of the theoretical yield. Softening point is 75° C. on the Kofler heating bench. The phosphorus content is 8.4% (theoretical 8.5%) and the OH number is 0.

c. Production, Processing and Checking the Moulding Compounds

The amounts given in table 1 (figures in % by weight) for the components employed were melted in a twin shaft extruder, mixed, extruded as strands and granulated. The production of moulding compounds can, for example, be carried out with a ZSK 32 extruder from Werner & Pfleiderer, with the compound at temperatures of 275° to 285° C. and at a worm speed of 130 rev/min and a throughput of 8 kg/h.

After adequate drying (e.g. up to 4 hours at 120° C.) the moulding compounds are moulded using normal injection moulding machines at compound temperatures of 260° C., a mould temperature of 80° C. and a period in the melted state of not more than 9 minutes, to form the moulded parts or standard test bars and the following tests are carried out:
determination of phosphorus content (elementary analysis, % P),
fire test to Underwriter Laboratories specifications (UL 94)

Table 2 shows the test data obtained.

Examples 1 to 8 in tables 1 and 2 show that the mixture as per the invention of phosphinic acid esters of polyphenols, anti-dripping agents, zinc borates and thermoplastics with predominantly aromatic main chains and high thermal deflection temperatures (Vicat B≧180° C.), the polyamide mixtures from which provide flameproofing, assessed at V-O as per UL94, does not drip in 1.6 mm thick test pieces.

The associated use of thermoplastics with predominantly aromatic main chains and high thermal deflection temperatures (Vicat B≧180° C.) permits a significant reduction in the amounts of compound with phosphorus content as per the invention needed for V-O/1.6 mm as per UL 94.

The associated use of other phosphorus compounds and of halogen and nitrogen compounds allows a reduction in the amounts of phosphinic acid ethers as per the invention required for V-O/1.6 mm.

We claim:

1. Thermoplastic polyamide moulding compounds containing

A) 3 to 20% by weight, based on polyamide, of phosphinic acid ester of polyphenols of formula (I)

TABLE 1

| | Composition of polyamide moulding compounds in % by weight |
| | Components |
| | I | II | III | IV | V | VI | VII | VIII | IX | X | XI | XII | XIII | XIV | XV |
|---|---|---|---|---|---|---|---|---|---|---|---|---|---|---|---|
| Comparative Example | | | | | | | | | | | | | | | |
| 1 | 53.0 | | | | 18.0 | | | 1.0 | 8.0 | | | | 20.0 | | |
| 2 | 51.0 | | | | 10.0 | 10.0 | | 1.0 | 8.0 | | | | 20.0 | | |
| 3 | 53.0 | | 9.0 | | | 9.0 | | 1.0 | 8.0 | | | | 20.0 | | |
| Example | | | | | | | | | | | | | | | |
| 1 | 49.0 | 12.0 | | | | | | 1.0 | 8.0 | 10.0 | | | 20.0 | | |
| 2 | 49.0 | | 12.0 | | | | | 1.0 | 8.0 | 10.0 | | | 20.0 | | |
| 3 | 49.0 | | | 12.0 | | | | 1.0 | 8.0 | 10.0 | | | 20.0 | | |
| 4 | 49.0 | | | | 12.0 | | | 1.0 | 8.0 | 10.0 | | | 20.0 | | |
| 5 | 49.0 | | | | 12.0 | | 1.0 | | 8.0 | 10.0 | | | 20.0 | | |
| 6 | 36.0 | | | | 7.5 | 7.5 | | 1.0 | 8.0 | 20.0 | | | 20.0 | | |
| 7 | 49.0 | | | | 12.0 | | | 1.0 | 8.0 | | 10.0 | | 20.0 | | |
| 8 | 36.0 | | | | 7.5 | 7.5 | | 1.0 | 8.0 | | 20.0 | | 20.0 | | |
| 9 | 39.0 | | | | 12.0 | | | 1.0 | 8.0 | | | 20.0 | 20.0 | | |
| 10 | 45.0 | | | 10.0 | | | | 1.0 | 8.0 | | | | 20.0 | 6.0 | |
| 11 | 45.0 | | | | 10.0 | | | 1.0 | 8.0 | 10.0 | | | 20.0 | 6.0 | |
| 12 | 40.0 | | | | 7.5 | 7.5 | | 1.0 | 8.0 | 10.0 | | | 20.0 | | 6.0 |

TABLE 2

| | | Test data | | |
|---|---|---|---|---|
| | | % by weight phosphorus | Dripping data | Fire data UL94/ 1.6 mm |
| Comparative example | 1 | 2.3 | non-dripping | V-O |
| | 2 | 2.1 | non-dripping | V-O |
| | 3 | 1.9 | non-dripping | V-O |
| Example | 1 | 1.7 | non-dripping | V-O |
| | 2 | 1.6 | non-dripping | V-O |
| | 3 | 1.6 | non-dripping | V-O |
| | 4 | 1.5 | non-dripping | V-O |
| | 5 | 1.5 | non-dripping | V-O |
| | 6 | 1.9 | non-dripping | V-O |
| | 7 | 1.5 | non-dripping | V-O |
| | 8 | 1.6 | non-dripping | V-O |
| | 9 | 1.5 | non-dripping | V-O |
| | 10 | 1.3 | non-dripping | V-O |
| | 11 | 1.3 | non-dripping | V-O |
| | 12 | 1.6 | non-dripping | V-O |

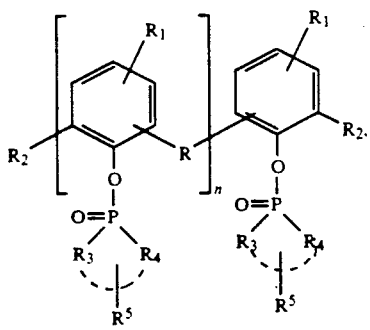

in which
n is an integer between 1 and 20,
R is an alkylene with 1 to 4 carbon atoms, a cycloalkylene with 5 to 9 carbon atoms or, when n is 1, R is a direct bond, sulphonyl, carbonyl, or sulphur,
$R_1$ and $R_2$ are, each independent of the other, hydrogen, halogen alkyl with 1 to 12 carbon atoms, cycloalkyl with 5 to 9 carbon atoms, or aryl with 6 to 10 carbon atoms,
$R_3$ and $R_4$ are alkyl with 1 to 4 carbon atoms or aryl with 6 to 10 carbon atoms, or $R_3$ and $R_4$ together represent alkylene with or without $R_5$ which is alkyl with 1 to 4 carbon atoms, B) Anti-dripping agents with a total amount not exceeding 6% by weight, based on polyamide, comprising
  B1) 0.1-3% by weight, based on polyamide, of a polyfluoroethylene polymer or
  B2) 0.1-5% by weight, based on polyamide, of an aramide,
C) 0.5 to 15% by weight, based on polyamide, of zinc borate,
D) 1 to 30% by weight, based on polyamide, of a thermoplastic with a predominantly aromatic main chain and a high thermal deflection temperature of Vicat B≧180° C.

2. Moulding compounds as claimed in claim 1 which contain phosphinic acid esters as in formulae (II) and (III)

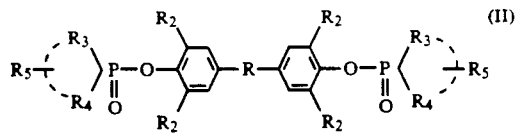

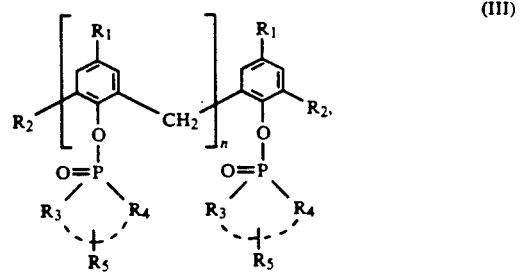

where
n represents an integer between 2 and 15,
R represents a single bond, methylene, isopropylidene, oxygen, sulphur, sulphonyl or carbonyl, $R_1$ represents hydrogen, halogen or an alkyl with 1 to 12 carbon atoms,
$R_2$ represents hydrogen, halogen or an alkyl with 1 to 4 carbon atoms,
$R_3$ and $R_4$ each independent of the other represent methyl, ethyl or phenyl and $R_3$ and $R_4$ together represent butylidene or $R_5$-alkyl-butylidene, and
$R_5$ is alkyl with 1 to 4 carbon atoms.

3. Moulding compounds as claimed in claim 1, characterised in that they contain phosphinic acid esters as in formulae (IV) and (V)

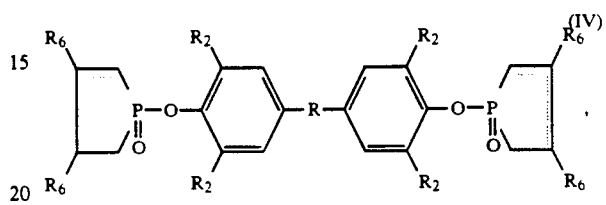

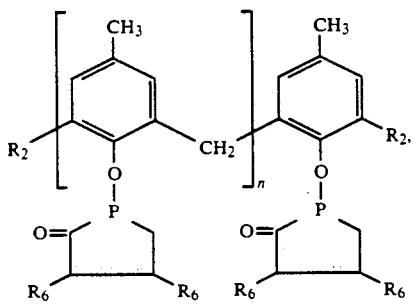

in which
n is an integer between 2 and 8,
R has the meaning described above,
$R_2$ represents hydrogen or methyl groups and
$R_5$ also represents hydrogen or methyl groups.

4. Moulding compounds as claimed in claim 1, characterised in that polyamide 6 or polyamide 66 is the polyamide.

5. Moulding compounds as claimed in claim 1, characterised in that components A) are in amounts of 5 to 15% by weight.

6. Moulding compounds as claimed in claim 1, characterised in that components B) are in amounts of 0.3 to 2.5% by weight.

7. Moulding compounds as claimed in claim 1, characterised in that components C) are in amounts of 3-12% by weight.

8. Moulding compounds as claimed in claim 1, characterised in that, as thermoplastics D) with predominantly aromatic main chains and high thermal deflection temperatures (Vicat B≧180° C.), they contain polyalkylenecarboxylic acid ester, polysulphones, polyethersulphones, polyketones, polyetherketones, polyphenyleneoxides or polyarylenesulphides.

9. Moulding compounds as claimed in claim 1, characterised in that they contain additional pigments, inorganic fillers, reinforcing agents such as glass fibres, stabilizers, flow agents, mould release agents, anti-static agents and/or other flameproofing agents.

10. Moulding compounds as claimed in claim 1, characterised in that, as other flameproofing agents, phosphorus acid esters of novolaks, melamine compounds and suitable aliphatic compounds containing chlorine are used as flameproofing agents.

11. The process for the production of the polyamide moulding compounds with compositions as claimed in claim 1, characterised in that components A), B), C) and D) are mixed in the known way and melt-compounded or melt-extruded using normal equipment at temperatures of 200° C. to 330° C.

12. Moulding compounds as claimed in claim 1 wherein B) is 0.3 to 1.0% by weight, based on polyamide, of a polyfluoroethylene polymer or 0.1 to 5% by weight, based on polyamide, of an aramide.

13. Moulding compounds as claimed in claim 1 wherein C) is zinc borate hydrate.

* * * * *